(12) United States Patent
Bali et al.

(10) Patent No.: US 8,539,075 B2
(45) Date of Patent: Sep. 17, 2013

(54) ON-DEMAND GLOBAL SERVER LOAD BALANCING SYSTEM AND METHOD OF USE

(75) Inventors: Bahri B Bali, Cary, NC (US); Gordan G Greenlee, Endicott, NY (US); Richard E Weingarten, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 11/464,097

(22) Filed: Aug. 11, 2006

(65) Prior Publication Data

US 2007/0250631 A1 Oct. 25, 2007

Related U.S. Application Data

(60) Provisional application No. 60/793,637, filed on Apr. 21, 2006.

(51) Int. Cl.
*G06F 15/173* (2006.01)

(52) U.S. Cl.
USPC ............ 709/226; 709/223; 709/224; 709/225

(58) Field of Classification Search
USPC ................................................ 709/223–226
See application file for complete search history.

(56) References Cited

U.S. PATENT DOCUMENTS

| | | | |
|---|---|---|---|
| 5,473,773 A | 12/1995 | Aman et al. | |
| 6,003,083 A | 12/1999 | Davies et al. | |
| 6,442,583 B1 | 8/2002 | Eilert et al. | |
| 7,086,061 B1* | 8/2006 | Joshi et al. | 718/105 |
| 7,155,723 B2* | 12/2006 | Swildens et al. | 718/105 |
| 7,181,524 B1* | 2/2007 | Lele | 709/226 |
| 7,254,626 B1* | 8/2007 | Kommula et al. | 709/223 |
| 2002/0062454 A1 | 5/2002 | Fung | |
| 2002/0138443 A1* | 9/2002 | Schran et al. | 705/64 |
| 2003/0088672 A1 | 5/2003 | Togasaki et al. | |
| 2003/0177182 A1 | 9/2003 | Clark et al. | |
| 2003/0188208 A1 | 10/2003 | Fung | |
| 2003/0196126 A1 | 10/2003 | Fung | |
| 2003/0200473 A1 | 10/2003 | Fung | |
| 2004/0103194 A1* | 5/2004 | Islam et al. | 709/225 |
| 2004/0122950 A1 | 6/2004 | Morgan et al. | |
| 2005/0033858 A1* | 2/2005 | Swildens et al. | 709/232 |
| 2005/0120095 A1* | 6/2005 | Aman et al. | 709/219 |

* cited by examiner

*Primary Examiner* — Asad Nawaz
*Assistant Examiner* — Najeebuddin Ansari
(74) *Attorney, Agent, or Firm* — Lisa J. Ulrich; Roberts Mlotkowski Safran & Cole, P.C.

(57) ABSTRACT

A method and system for measuring performance and balancing workload of sites and servers is provided. The method comprises measuring performance of one or more servers located at different sites of the network and computing a performance metric for each of the sites or one or more servers at each of the sites. The method further comprises providing a bias to the performance metric and routing a request to one of the different sites or one of the one or more servers based on the biased performance metric.

38 Claims, 3 Drawing Sheets

ON-DEMAND GLOBAL SERVER LOAD BALANCING SYSTEM AND METHOD OF USE

INCORPORATION BY REFERENCE

The present application claims benefit of priority to U.S. provisional application Ser. No. 60/793,637, filed on Apr. 21, 2006, the disclosure of which is incorporated by reference herein in its entirety. The present application also incorporates by reference in its entirety the contents of U.S. application Ser. No. 11/098,854, filed on Apr. 5, 2005.

FIELD OF THE INVENTION

The invention generally relates to a system and method of load balancing servers in a network and, more particularly, to a system and method for routing requests to a server based on metrics such as load balancing considerations and/or proximity considerations.

BACKGROUND OF THE INVENTION

In network operations, balancing server loads is an ongoing concern with varying solutions employed. The industry overall has attempted to address global server load balancing (GSLB) issues and typically includes one or more of the following solutions.

Active-Standby

This solution is a more traditional disaster recovery approach where deployment uses two data centers; one is active and a second remains idle operating in standby mode. When the active faults, the second becomes the active data center.

Active-Active

This deployment alternative is typically more cost-effective and more resilient to interruptions. This solution usually has at least two data centers that are actively serving data so that if one center is disrupted, the other data center continues processing on behalf of the other, perhaps with degraded service.

Proximity

This solution is a variation of the active-active GSLB deployment which is configured to route the client to the "closest" data center to achieve better exploiter experience and to save or avoid over-usage of expensive wide-area bandwidth. This deployment alternative is attractive for applications that involve the transfer of large volumes of data, require a global presence or relies on real-time interaction with remote users.

It has been found that none of the above techniques are capable of addressing the compound and complex demands of current systems and networks. For example, in a networked system, it has been found that load balance of millions of query activities over a number of different types of servers with different configurations and networking capacity, locally or over dispersed locations, is difficult to manage. For example, using a light weight directory protocol (LDAP) scenario as an example, since no two exploiters' (requesters) requests typically consume equal amounts of LDAP resources, determining optimal load balancing for these varying requests at a server or global level becomes an issue. This same issue arises since, in real-world applications, networks include servers of various capacities and configurations. So, too many longer running queries hitting one LDAP server or site may impact the whole site throughput and, in turn, negatively impact other exploiting applications also directed to that site or other sites.

Accordingly, there exists a need in the art to overcome the deficiencies and limitations described hereinabove.

SUMMARY OF THE INVENTION

In an aspect of the invention, a method of processing requests in a network comprises measuring performance of one or more servers located at different sites of the network and computing a performance metric for each of the sites or one or more servers at each of the sites. The method further comprises providing a bias to the performance metric and routing a request to one of the different sites or one of the one or more servers based on the biased performance metric.

In another aspect of the invention, a method of routing requests in a network comprises computing a performance metric for a site and/or a server of a plurality of servers and routing a request to the site and/or the server based on the performance metric for balancing workload among the plurality of servers. The performance metric includes a biased response time metric associated with the site or the server.

In another aspect of the invention, a system for routing requests in a network, comprises at least one component to:
  measure performance of one or more servers at different sites;
  generate a performance metric for each of the one or more servers;
  provide a bias to the performance metric; and
  route a request to one of the different sites or one of the one or more servers based on the biased performance metric to balance a workload among the one or more servers.

In another aspect of the invention, a method to provide a service for establishing a computing infrastructure comprises collecting performance measurements for different sites in a network and generating at least one biased server performance metric based on the performance measurements of servers located at the different sites. The service also includes routing a request to a server at one of the different sites based on the biased server performance metric.

In yet another aspect of the invention, a system for balancing workload comprises at least one module or mechanism to:
  collect performance measurements for at least any one of a server, a virtual cluster and a site;
  generate at least any one of a server performance metric, a virtual cluster metric and a site performance statistic based on the performance measurements; and
  route a request to the server based on at least any one of the server performance metric, the virtual cluster metric, the site performance statistic and any combination thereof.

In another aspect of the invention, a method of processing queries in a network comprises measuring performance of one or more servers at different locations and routing a request to the one of the one or more servers based on a computed performance metric including proximity to the requester and a biased allocation of workload amongst the one or more servers.

In another aspect of the invention, a computer program product comprising a computer usable medium having readable program code embodied in the medium is provided. The computer program product includes at least one component to collect performance measurements for different sites in a network and generate at least one biased server performance metric based on the performance measurements of servers located at the different sites. At least one component also routes a request to a server at one of the different sites based on the biased server performance metric.

DETAILED DESCRIPTION OF EMBODIMENTS OF THE INVENTION

The invention, in embodiments, is directed to a system and method for monitoring, routing and balancing of requests between servers, either at a same site or at remote sites, in an efficient manner. More specifically, the system and method of the invention monitors network activities and determines which servers or sites among a plurality of sites should receive a client request based on metrics such as, for example, load balancing considerations and/or proximity or location of the client to a server. In embodiments, the load balancing employs a "bias" to optimize the network traffic over a real world, diverse network, e.g., different types and numbers of servers at individual sites. The bias, for example, takes into consideration the overall architecture of the network such as, for example, networking speed, number of servers at individual sites, types of servers and their specific configurations, e.g., amount of cache, etc. This will increase the overall efficiency of the network.

In embodiments, a site selector in communication, over a network, for example, with a plurality of EDRMs (Enterprise Directory Resource Monitor) determines the distance between a client (requester) and the nearest EDRM. Distance factors may be taken into account for routing decisions so that inordinately long distances are avoided which may cause unintentional delays simply due to latency or propagation issues. Additionally, the EDRM, which is a load balancing system, monitors the local servers and applies a bias to the load balancing metric. The system and method of the invention may also apply a weight to the metrics, depending on a particular application. Based on the biased load balance metric and/or proximity, the site selector will make a determination for routing of traffic and/or queries to a specific site and/or server. So, using the metrics noted herein, the system and method of the invention may take into account the distance one site is versus another, the capacity of the site or server or the load at a particular site or server, amongst other considerations, to increase the efficiency of the overall network. This will avoid inadvertent slowness if a request were to be routed to a site too distant or overcapacity for efficient response time.

Figure 1:
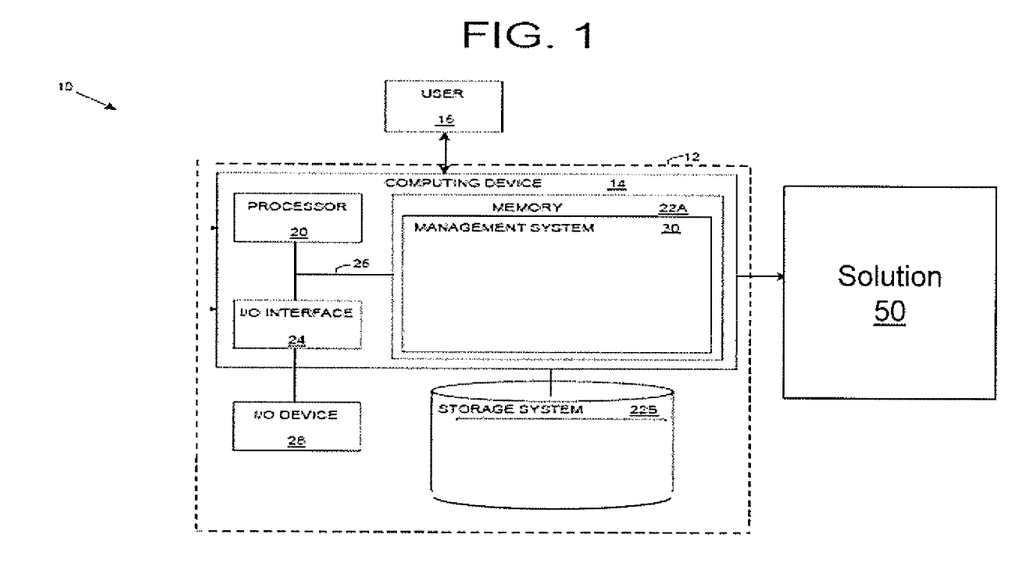
FIG. 1 shows an illustrative environment for implementing the steps in accordance with the invention.

FIG. 1 shows an illustrative environment 10 for managing the processes in accordance with the invention. The environment 10 includes a computer infrastructure 12 that can perform the processes described herein. In particular, the computer infrastructure 12 includes a computing device 14 that comprises a management system 30, which makes computing device 14 operable to apply the metrics, e.g., load balancing, proximity determination, biasing and weighting of the metrics, of the present invention, e.g., process described herein. The computing device 14 includes a processor 20, a memory 22A, an input/output (I/O) interface 24, and a bus 26.

Further, the computing device 14 is in communication with an external I/O device/resource 28 and a storage system 22B.

As is known in the art, in general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

The computer infrastructure 12 of FIG. 1 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein.

Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.), and/or utilize any combination of various types of transmission techniques and protocols. As discussed herein, the management system 30 enables the computer infrastructure 12 to manage servers in accordance with the process described herein to provide a solution 50. The solution 50 may include, for example, the routing of a request to the server which may perform the request in the most efficient manner, whether this is the closest server to the requestor or the like.

In embodiments, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

In further embodiments, the invention provides a business method that performs the steps of the invention on a subscription, advertising, and/or fee basis. That is, a service provider, such as a Solution Integrator, could offer to provide notification profiles to a user. In this case, the service provider can create, maintain, and support, etc., a computer infrastructure that performs the steps of the invention for one or more customers or clients. In return, the service provider can receive payment from the customer(s) under a subscription and/or fee agreement and/or the service provider can receive payment from the sale of advertising content to one or more third parties.

Figure 2:
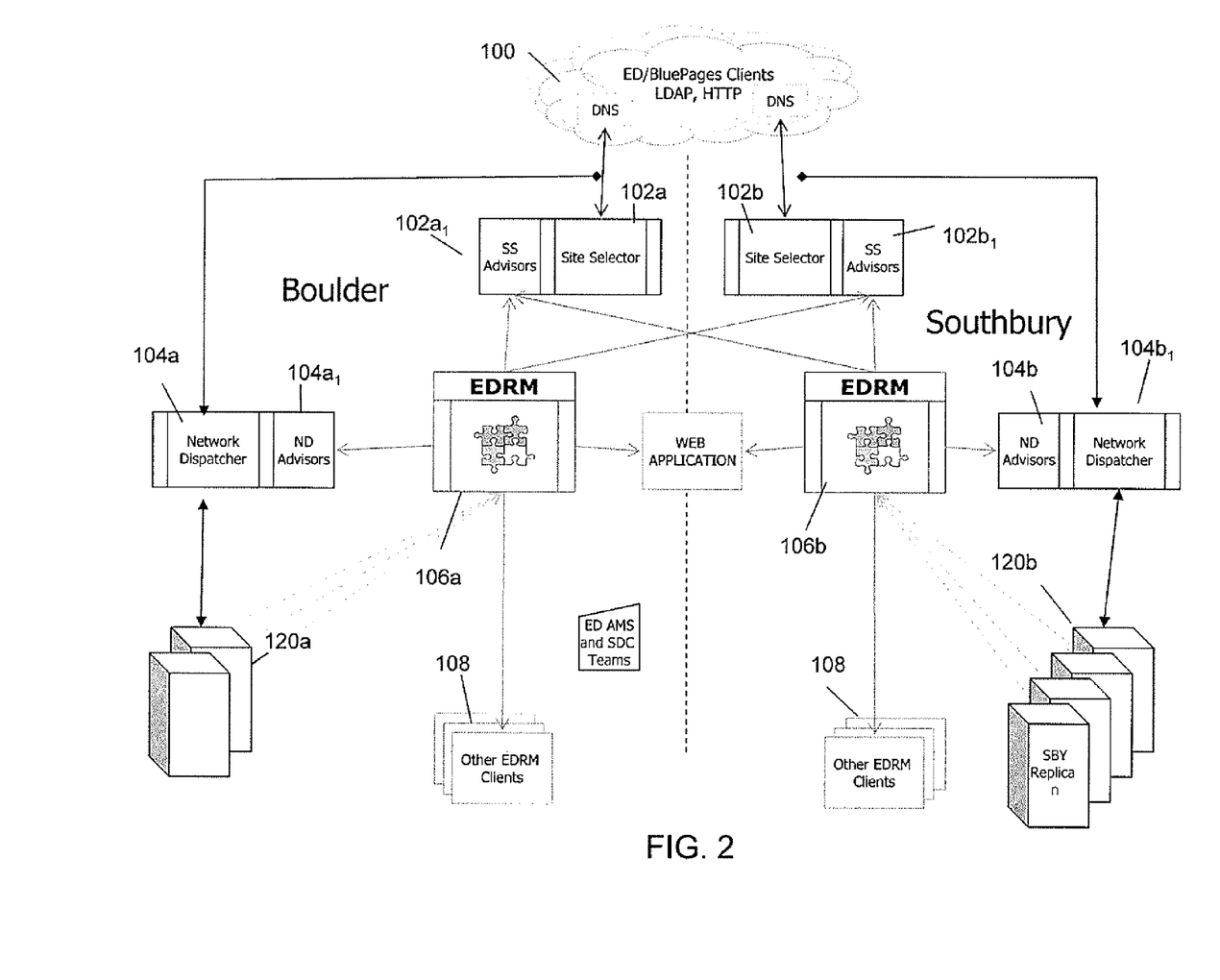
FIG. 2 is a block diagram of an embodiment illustrating aspects of the invention.

FIG. 2 is a diagram of an embodiment illustrating aspects of the invention. For illustration, FIG. 2 depicts servers or a cluster of servers at two locations, Boulder, Colo. and Southbury, Conn.; however, it should be understood by those of skill in the art that the system described herein is not limited to two sites. It should also be understood by those of skill in the art that the present invention contemplates the use of different types of servers at the different sites, each or some of which have different network capacities, configurations, etc. Additionally, it should be understood that the present invention contemplates each site with the same or different number of servers, depending on the particular provider, for example.

Referring still to FIG. 2, this embodiment shows a client 100 (e.g., server), which can have any known protocol such as, for example, LDAP or HTTP. The client 100 has an associated DNS (Domain Name System) which is in communication with respective site selectors 102a and 102b and network dispatchers 104a and 104b, each of which may be associated with different geographic locations such as, for example, Boulder, Colo. and Southbury, Conn. The site selectors 102a and 102b each have associated site selector (SS) advisors 102a$_1$ and 102b$_1$; whereas, the network dispatchers 104a and 104b have network dispatcher (ND) advisors 104a$_1$ and 104b$_1$.

In embodiments, each site selectors 102a and 102b communicates with each EDRM (Enterprise Directory Resource Monitor) 106a and 106b. The EDRMs 106a and 106b are each respectively in communication with other EDRM clients 108, the respective network dispatchers 104a, 104b, and are also associated with respective local servers 120a and 120b. The network dispatchers 104a and 104b are also in communication with the servers 200a and 200b, located at geographically different sites.

Of course, any number of sites may exist for a domain(s), as one of ordinary skill should recognize, each with a same or different number of servers, types of servers, etc. For example, the present invention may be implemented with three or more sites. In this scenario, each site will have an associated site selector, network dispatcher, EDRM and server or servers, in the configuration extrapolated from that shown with reference to two sites.

By implementing this schema, when a client 100 issues a request, it is routed to the nearest DNS (which is typically known in client cache). The DNS determines that the request resolves to a particular site selector. The site selector then communicates with the EDRMs at individual sites and responds by returning an Internet Protocol (IP) address to the client (typically via the DNS) of the server or cluster of servers which can most efficiently process the request, whether that be based on proximity and/or capacity of the server/site, as described more fully below.

In embodiments, the network dispatchers 104a and 104b are configured to obtain individual response time values, which may be biased (for a given server/port combination), from an EDRM Status Daemon (discussed below) to calculate normalized load values using the following formula:

rt=x; (rt: response time (ms))
crt=6000; (crt: critical response time (ms))
lb=10; (lb: lowerbound (load))
ub=1000; (ub: upperbound (load))
factor=(ub−lb)/crt;
load=round((factor*rt)+lb).

It should be recognized that the above example is only one non-limiting illustrative example in accordance with the embodiments discussed herein. Accordingly, the above example may use different response times and bounds, in accordance with the invention.

The network dispatcher advisors may also include fault-tolerance methods. In embodiments, the network dispatcher advisors 104a$_1$ and 104b$_1$ are configured to tolerate response times that are greater than a critical response time, which is the threshold used to determine whether a server/port needs to be marked down or not. The network dispatcher advisors 104a$_1$ and 104b$_1$ may additionally provide a limit on how many consecutive response times that are greater than the critical response time can be set. Until that limit is exceeded, the network dispatcher advisors 104a$_1$ and 104b$_1$ use the last valid load value. If a response time value cannot be obtained at all, the last load value cached from the previous advisor cycle for the server/port is used; if there is no last load value available. In embodiments, the default load value set in the network dispatcher advisor configuration is used until the administrators intervene.

The network dispatchers 104a and 104b may also timestamp the last two response time values obtained from the EDRM Status Daemon and make a comparison thereof. If they are the same, the last valid load value may be used.

Still referring to FIG. 2, the site selector advisors 102a$_1$ and 102b$_1$ are configured to obtain average response time for a given site from the EDRM Status Daemon. The site selector advisors 102a$_1$ and 102b$_1$ are also configured to be responsible for providing load values, which act as a DNS server and returns an IP address based on proximity and overall site performance. The load values are calculated, in embodiments, by the EDRMs, using a bias.

The calculated normalized load values may be biased to fine tune the system to proactively identify those sites that have the required capacity to respond to the request in a most efficient manner. In this way, the method and system of the invention will, in a timely manner, automatically direct traffic away from sites or servers which may be running close to, at or over capacity, e.g., shed the load to another site or server, helping to flatten the load amongst all servers.

In embodiments, the site selector advisors 102a$_1$ and 102b$_1$ are also configured to implement fault-tolerance methods such as, for example, implemented by the employed network dispatch advisors 104a$_1$ and 104b$_1$. The site selector advisors 102a$_1$ and 102b$_1$ may be written in Java. (Java and all Java-based trademarks are trademarks of Sun Microsystems, Inc. in the United States, other countries, or both.)

In embodiments, the EDRMs 106a and 106b monitor the system to ascertain relative locations of requests and, in embodiments, are responsible for measuring individual response times and computing the average site response time using server response times for defined servers of any protocol (e.g., LDAP, HTTP). The EDRMs 106a and 106b also allow computed response times to be changed by a user-supplied factor to bias the weight for an individual server port or site, as well as to provide response time data for sites and servers to connecting clients over HTTP, for example.

Basically, the bias is a "tuning" of the environment to obtain more reasonable estimates of capacity of a server or a cluster of servers at particular sites. In one example, the bias will be factored into the normalized load balancing to realistically balance the network load. By using the biased load balancing feature of the present invention, it is now possible to "flatten" the environment and reduce the amount of spikes at any given location or server. Also, it should be understood by those of skill in the art that the bias can identify, proactively, those sites that are near or over capacity, in a timely manner, so that traffic can be shed to other sites or servers.

The bias may be factored into the above-noted load balancing formula using a "multiple" created by an administrator, taking into account such factors as, for example:
  Networking speed, e.g., 100 gigabytes vs. 24 baud modem;
  amount of servers at any individual site;
  types of servers, e.g., capacity; and/or
  overall configuration of servers at a particular site.

The sites or servers with the least capacity will obtain the highest multiple, in order to balance the load. For example, if there are four sites, with four, three, two and one server, respectively, each site will receive a different bias. In this example, assuming that the only difference between each site is the number of servers, a bias may include 0.25, 0.5 and 0.75 and 1, respectively, for each site. In this manner, using these multiples, the load will be balanced over the entire network, taking into consideration the number of servers at each site, e.g., the least amount of servers will have the highest number so that load will be equaled amongst all of the sites. The bias thus accentuates the load issue and therefore it will start to divert traffic to another server/site prior to there being any capacity problems.

Alternatively, the bias may be performed by increasing the normalized load values with bias factors over 1.0. For example, the bias values could also be chosen (for the sites having 4, 3, 2, and 1 servers, noted above) as 1.0, 1.25, 1.50, and 1.75. This would have the same effect as the example noted above. For instance, the site with the highest number of servers would have a bias factor 1.0; so its load is not changed. And, the site with two servers will have a load value that is 25% worse than it actually is, because its bias factor is 1.25, etc.

In addition, the load balancing noted above may also be used in combination with other metrics such as, for example, the proximity between the client and the server. In embodiments, the present invention contemplates the use of a weighting feature with these metrics. For example, depending on a particular application, the load balancing may be weighted evenly with the distance (proximity) metric such that the request will be forwarded to a closest server which is not above or at its capacity. Of course, other weights are also contemplated by the invention such as, for example, placing a higher weight, e.g., 75%, on the biased load balancing metric; whereas, a distance metric will be weighted only, e.g., 25%.

In further embodiments, the EDRMs 106a and 106b have several features, including, Configurable Options and Parameters, Extended Server/Protocol Support, Probe Daemon, Console Daemon, Status Daemon, logging, and fault-tolerance. By way of illustrative example, in embodiments, the EDRM includes configurable options and parameters which, for example, may be stored in an XML file to increase readability and to reduce user error. Options may be, for example, user ID information, encryption or other features used by the service. The parameters may include connection parameters, plug-ins or monitoring features required by the service to monitor the protocols.

The EDRM also includes a Probe Daemon, Status Daemon and services. By way of illustration, the Probe Daemon is used by the EDRM to grab pertinent information, as discussed in greater detail below. The Status Daemon provides, for example, a mechanism to communicate with the site selector advisors $102a_1$ and $102b_1$ or the network dispatcher advisors $104a_1$ and $104b_1$, as discussed herein. The services may include, for example, measuring performance response time, interfaces for particular protocols, etc. More specifically, the services may include:
  Java classes that implement EDRM's service interface;
  Accessing a server and port over a specified protocol (e.g., LDAP); and/or
  Verifying probe results, if necessary, e.g., the server will obtain results when the probe daemon starts probing.

By way of one illustrative example, services may be for BluePages™ and BlueGroups™ HTTP APIs in order to verify the results they retrieve. (BluePages and BlueGroups are trademarks of IBM, Corp. in the United States, other countries, or both.) More specifically, by way of illustration, a probe may be used for an LDAP server and, based on a response, for example, there may be a "not found error". If a "not found error" is provided, the system and method of the invention may return a response time at a threshold value indicating that further action may have to be taken in order to find an available server.

The Probe Daemon includes a probe configuration (i.e., server, port, service, critical response time, etc.) that can be stored in an XML file or in an LDAP server using a predefined schema. In embodiments, the XML file increases readability, reduces user error, and provides a hierarchical structure for site, cluster, server, and port relationship. On the other hand, the LDAP server is easy to maintain as it provides centralized storage for site, cluster, server, and ports information. Storing in LDAP requires a schema change on the LDAP server. Also, the LDAP tools such as "ldapmodify" are required to change the information. Additionally, in both XML and LDAP servers, there is no extra security maintenance needed, since basic security provided by the operating and file system is sufficient. In further embodiments, multiple copies may be required to be edited on multiple sites, using XML.

In embodiments, the Probe Daemon is configured to start and stop "service" threads each of which is responsible for accessing a server/port combination over a specified protocol and for measuring response time. Additionally, the Probe Daemon stores the last probe results for each server/port combination in memory to be served out to EDRM clients over HTTP, and sends notifications to administrators if a problem occurs. In embodiments, the Probe Daemon runs continuously.

The EDRM Console Daemon allows administrators to invoke EDRM-specified commands while the Probe Daemon and other EDRM components are running. Additionally, the Console Daemon may be implemented for debugging and/or testing the EDRM, as should be recognized by those of skill in the art.

The EDRM Status Daemon is, in embodiments, an internal HTTP server that provides the latest server and site response time values to clients. The Status Daemon is configured to provide data in CSV (comma-separated values) and XML formats, and is accessible from any HTTP client (e.g., a Web browser). The Status Daemon is also configurable to:
  accept requests only from specified IP addresses;

enforce a limit on request sizes (i.e., to prevent buffer-overload attacks);

accept privileged requests such as "start" and "stop" from authenticated users; and log incoming requests.

The Status Daemon is also configured to be utilized by the network dispatcher and site selector advisors (as discussed above); however, other HTTP clients can obtain the response time data. Also, the Status Daemon is configured to allow remote clients to execute privileged requests, which can be defined in the EDRM configuration, to start, stop, or restart the EDRM. Users can develop new Java classes (extending EDRM's "Request" class) to support different remote requests in addition to the built-in requests already provided by EDRM.

The following is an example of a Status Daemon request:

```
public class NewAverage implements com.ibm.edrm.status.Request
{
  public NewAverage( ) { }
  public String getEyeCatcher( ) {
    return "NewAverage";
  }
  public void initialize(RequestConfig reqConfig) {
    // Do something here to initialize this request class..
  }
  public StringBuffer perform(RequestListener listener,
HttpRequest httpRequest) {
    // Do something here to respond to this request. For this
example,
    // perhaps, it'd be the calculation of the average response time
    // for the site. A StringBuffer containing The response text
    // which must be a valid HTTP response (i.e., valid Content-
Type
    // header content in CSV or XML format, etc.), is returned to
    // the caller object.
  }
  public void dispose( ) {
    // Release the resources used by this request class.
  }
}
```

The EDRM also includes (or employs, implements) several fault-tolerance mechanisms. For example, the fault tolerance can be invoked by a front-end program which is capable of restarting EDRM in case of a fatal error such as Java VM (JVM) crash (e.g., OutOfMemory exception), unauthorized termination by an external command (e.g., kill), etc. The fault tolerance further includes, in embodiments, the JVM memory growth monitoring and automatic restart if a user-supplied threshold is exceeded. The fault tolerance also includes, for example, Periodic process ID monitoring and automatic restart if the process is no longer active; and/or Retry logic in the Probe Daemon for probes failed unexpectedly (e.g., connection timeout); capable of re-probing a server port for a user-supplied amount of times.

The fault tolerance feature is also configured to ignore user-supplied errors/exceptions captured by probes that are spawned by the Probe Daemon (e.g., an LDAP name not found exception). Also, the fault tolerance is configured to cache the probe configuration data in memory in case the resource (i.e., the XML file or the LDAP server) becomes unavailable.

In addition, the EDRM provides a Java API to allow clients to develop new services and new requests (as previously discussed). For example, clients implementing EDRM service and request interfaces can employ original business logic to extend EDRM's capabilities. For example, a new service class for monitoring an MQ queue manager can be developed and plugged-in to the Probe Daemon. The EDRM also provides Java and Perl APIs for clients connecting to EDRM's Status Daemon to obtain server and site response time data. These APIs hide the implementation of HTTP connection to the EDRM Status Daemon, data retrieval, parsing, and fault-tolerance techniques in methods that can be accessed by client applications.

The EDRM also is configured to provide several Java utility classes which, in embodiments, offer publicly accessible methods that can be used by other applications to perform generic or EDRM-specific tasks (e.g., retrieving a password from an input source which can be a file, an LDAP attribute, or memory; encrypting/decrypting a file using a symmetric key; generating random LDAP filters for BluePages™; etc.)

The following is a Java example of an EDRM API Client Interface.

```
// Set some special pro perties to be passed to EDRM Client
//Interface.
//These are going to be interpreted by the "EdrmClient" class.
Properties props = new Properties( );
props.put("edrm.client.timeout", "10000");
props.put("edrm.server.status.uri", "http://localhost:8888/status?");
props.put("edrm.site.average.uri", "http://localhost:8888/average?");
props.put("edrm.client.debug", "off");
props.put("edrm.client.verbose", "on");
// Create an instance of the "Edrm Client" class, which
//encapsulates the HTTP/HTTPS connection to EDRM Status
//Daemon and data parsing..
EdrmClient ec = new EdrmClient(props);
//Retrieve sewer response times (returned as a List of
//ProbeResult objects) based on the URI and the site name
//specified as the query parameter.. The first parameter is the
//host name or IP address of the server being probed; null
//indicates results for all servers. The second parameter is the
//port number null is ignored when the first parameter is set to
//null The third parameter can contain any query parameters) to
//be appended to the URI.
List serverResponseTimes = ec.getStatus(null, null,
"&site=BOULDER_ED");
// Retrieve average site response times (returned as a List of
//ProbeResult objects, for one or more ports) based on the URI
//and the site name specified as the query parameter.. The first
//parameter is the IP address of the network dispatcher of the
//site where the EDRM instance being connected to is running;
//null indicates the default URI for site average will be used. The
//second parameter is a String containing comma delimited port
//numbers for which the average response time being asked; if
//set to null, it is ignored. The third parameter can contain query
//parameters) to be appended to the URI.
List averageSiteResponseTimes = ec.getAverage(null,
"389,636,80,443", "&site=BOULDER_ED");
// Release all the resources used by EdrmClient.
ec.dispose( );
// (C)Copyright IBM Corp.
```

The following is a PERL example of an EDRM API Client Interface:

```
# Create an empty EdrmClient object..
my $edrmClient = EDRM::Client->new( );
# Set general properties..
$edrmClient->setVerboseMode(1);
# Verbose mode is on
$edrmClient->timestampDisplay(1);
# Timestamp will be prefixed to the messages
$edrmClient->setDebugMode(0);
# Debug mode is off
$edrmClient->setDisplayWidth(90);
# Message wrapping at 90th character
# Set EDRM client properties..
```

-continued

```
$edrmClient->setTimeout(10);
# EDRM client time out is 10 seconds
$edrmClient->setServerStatusUri($statusUri);
# Set the EDRM status daemon URI for server status
$edrmClient->setAverageResponseTimeUri($averageUri); # Set the
EDRM status daemon URI for site status
#Retrieve server response times (returned as an array of
#ProbeResult objects) based on the URI and the site name
#specified as the query parameter.. The first parameter is the
#host name or IP address of the server being probed; null
#indicates results for all servers. The second parameter is the
#port number; null is ignored when the first parameter is set to
#null. The third parameter can contain any query parameters) to
#be appended to the URI.
my @serverResponseTimes = $edrmClient->getStatus(undefined,
undefined, "&site=BOULDER_ED");
# Retrieve average site response times (returned as an array of
#ProbeResult objects, for one or more ports) based on the URI
#and the site name specified as the query parameter.. The first
#parameter is the IP address of the network dispatcher of the
#site where the EDRM instance being connected to is running;
#null indicates the default URI for site average will be used. The
#second parameter is a String containing comma delimited port
#numbers for which the average response time being asked; if
#set to null, it is ignored. The third parameter can contain query
#parameters) to be appended to the URI.
my @averageSiteResponseTimes = $edrmClient-
>getAverage(undefined, "389,636,80,443", "&site=BOULDER_ED");
#(C)Copyright IBM Corp.
```

The EDRM also includes extended server server/protocol support. For example, the EDRM is configured to probe different servers and protocols using dynamically loaded service classes. A server/port can be associated with one service in the probe configuration and users can develop new service classes to support different types of servers/protocols in addition to the built-in services provided by the EDRM.

As should be now understood in view of the above discussion, it should further be recognized that any cluster of servers at any site may each have an associated EDRM. Further, each site may also have a site selector. In this illustrative example, the EDRM monitors the server and cluster operations associated with a site and as performance metrics for servers and/or clusters become available, site performance metrics may also be computed by the associated EDRM. For example, average response times for a site (averaged response for all virtual servers and/or servers associated with the site), perhaps on a sliding window basis, may be accumulated and comparatively used to determine site routing decisions. In embodiments, a bias is used with the average response time, in addition to, in embodiments, a weight factor described above.

The site statistics may also be used to compute site weights indicative of performance throughput. These weights or performance metrics (e.g., average site response time) may cause re-direction of requests, perhaps as a percentage of requests, to alternate sites according to the comparative performance of one site versus another site. In this way, an overloaded site or a less efficient site may receive a lower percentage of requests while a more efficient site might receive a higher percentage of requests. As time passes, these percentages may automatically adjust as conditions and performance metrics change. Further, distance factors may be taken into account for basing routing decisions so that inordinately long distances are avoided which may cause unintentional delays simply due to latency or propagation issues.

Figure 3:
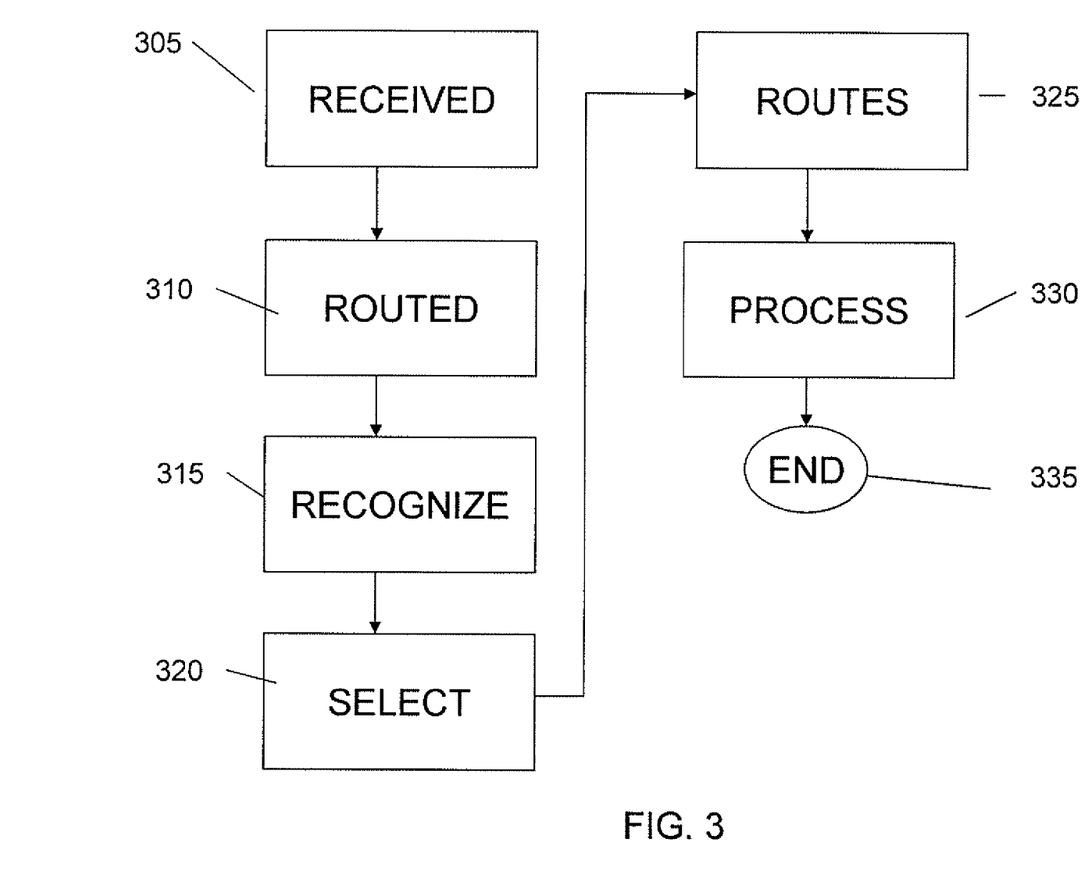
FIG. 3 is a flow diagram of an embodiment illustrating aspects of the invention.

FIG. 3 is a flow diagram of an embodiment showing steps of using the invention, beginning at 305. FIG. 3 (and all other Figures showing steps) may equally represent a high-level block diagram of components of the invention implementing the steps thereof. The steps of FIG. 3 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The computer readable code may be combined with the appropriate hardware and/or computing platform (which may be distributed software and hardware components, either new or pre-existing) for executing certain steps of the invention. Components (e.g., servers, or the like) of the computing platform may be interconnected via a network. Further, the software and hardware may be configured, perhaps as part of a service, for establishing the interoperability of the software and hardware components. The configuring may include such activity as initializing data structures and identifying components to one another (e.g., addresses), for example, to comply with the topology of a particular environment.

Continuing with the flow of FIG. 3, at step 305, a request is received from a client such as, for example, a web site or domain address. At step 310, the request is routed to a DNS, typically the closest or assigned, for lookup and resolution. At step 315, the DNS recognizes that the request is eligible for site selection processing and defers resolution to an associated site selector. A site may be selected based on site performance metrics that may include a weighted biased load factor and/or distance factor.

At step 320, the system and method may select one cluster or server over another based on the performance metrics associated with the server or cluster of servers. At step 320, the system and method may assure that a percentage of traffic routed overall to the servers (if appropriate) is proportionate to the weighted performance of the individual servers. In this way a more efficient performing server may receive more traffic on average.

At step 325, the system and method routes the request to the selected server for processing. At step 330, the request may be processed by the selected server and any reply returned to the requesting client in typical fashion. At step 335, the process ends.

While the invention has been described in terms of embodiments, those skilled in the art will recognize that the invention can be practiced with modifications and in the spirit and scope of the appended claims.

What is claimed is:

1. A method of processing requests in a network, comprising:
   measuring performance of one or more servers located at different sites of the network;
   computing a load balancing performance metric for each of the sites or the one or more servers at each of the sites;
   providing a bias to the load balancing performance metric; and
   routing a request to one of the different sites or one of the one or more servers based on the biased load balancing performance metric to balance a workload among the one or more servers,
   wherein the bias is a multiplier that accentuates a load issue by proactively taking into consideration overall architecture of the network in order to adjust the workload among the one or more servers prior to any capacity problems;
   the load balancing performance metric is a load value; and
   the load value is calculated by:

factor=(upperbound−lowerbound)/critical response time; and load=round((factor*response time)+lowerbound).

2. The method of claim 1, further comprising computing a proximity metric based on a distance between each of the different sites and a requestor.

3. The method of claim 1, wherein the load balancing performance metric includes the response time from the one or more servers at the sites.

4. The method of claim 1, wherein the biased load balancing performance metric is weighted.

5. The method of claim 1, further comprising:
routing the request to a site selector for selecting a site from the different sites;
selecting the site for processing the request based on the biased load balancing performance metric; and
routing the request to an address associated with the site for processing.

6. The method of claim 5, wherein the address is an address of a network dispatcher.

7. The method of claim 6, wherein the routing comprises:
selecting one server of a plurality of servers at the site; and
routing the request to the one server.

8. The method of claim 1, further comprising storing the site load balancing performance metric on at least one site selector.

9. The method of claim 1, wherein the bias is based on an architecture of the network.

10. The method of claim 9, wherein the architecture includes at least one of networking speed, number of servers at each site, types of servers and their specific configurations.

11. The method of claim 1, wherein the load value is biased to:
proactively identify sites of the different sites that have a capacity to respond to The request; and
automatically direct traffic away from sites which are running close to, at or over capacity.

12. The method of claim 11, wherein the load balancing performance metric is computed based on response times that are greater than the critical response time, which is a threshold used to determine whether the different sites or the one or more servers need to be marked down or not.

13. The method of claim 12, further comprising providing a limit on how many consecutive response times that are greater than the critical response time can be set, wherein:
until the limit is exceeded, a last valid biased load value is used to route traffic;
if a response time value cannot be obtained, a last biased load value cached from a previous cycle is used to route traffic; and
a default biased load value is used to route traffic.

14. The method of claim 13, further compromising time stamping a last two response time values and making a comparison thereof, wherein if the comparison provides a same value, the last biased load value is used to route traffic.

15. The method of claim 1, wherein the steps of claim 1 are provided on a subscription, advertising, and/or fee basis.

16. The method of claim 1, wherein the bias multiplier is highest for a server of the one or more servers that has a highest capacity with relation to other servers of the one or more servers.

17. A method of routing requests in a network, comprising:
computing a load balancing performance metric for at least one of a site and a server of a plurality of servers; and
routing a request to at least the site or the server based on the load balancing performance metric for balancing workload among the plurality of servers,
wherein the load balancing performance metric includes a biased response time metric associated with the site or the server of the plurality of servers,
wherein the biased response time metric comprises a computed response time changed by a bias factor, and
wherein the bias factor is a multiplier that accentuates a load issue by proactively taking into consideration overall architecture of the network in order to adjust the workload among the one or more servers prior to any capacity problems;
the load balancing performance metric is a load value; and
the load value is calculated by:
the bias factor=(upperbound−lowerbound)/critical response time and
load=round((the bias factor*the response time)+lowerbound).

18. A system implemented on hardware for routing requests in a network, comprising:
a computer infrastructure configured to:
measure performance of one or more servers at different sites;
generate a load balancing performance metric for each of the one or more servers;
provide a bias to the load balancing performance metric by altering the load balancing performance metric by a bias factor to generate a biased load balancing performance metric; and
route a request to one of the different sites or one of the one or more servers based on the biased load balancing performance metric to balance a workload among the one or more servers,
wherein the bias factor is a multiplier that accentuates a load issue by proactively taking into consideration overall architecture of the network in order to adjust the workload among the one or more servers prior to any capacity problems;
the load balancing performance metric is a load value; and
the load value is calculated by:
the bias factor=(upperbound−lowerbound)/critical response time; and
load=round((the bias factor*response time)+lowerbound); and
the providing the bias is implemented using at least one processor of the computer infrastructure.

19. The system of claim 18, wherein:
the computer infrastructure is further configured to store stores the load balancing performance metric;
the computer infrastructure comprises an enterprise directory resource monitor (ERDM) that monitors the system to ascertain relative locations of requests, measures individual response time, and computes average site response time; and
the ERDM comprises a probe daemon, a console daemon, and a status daemon.

20. The system of claim 18, wherein the computer infrastructure is further configured to compute a proximity metric based on a distance between the different sites and a requestor.

21. The system of claim 20, wherein the load balancing performance metric includes the response time from the one or more servers at the sites, which is weighted.

22. The system of claim 18, wherein the computer infrastructure is further configured to:
route the request to a site selector for selecting a site from the sites;
select the site for processing the request based on the biased load balancing performance metric; and route the request to an address associated with the site for processing.

23. The system of claim 18, wherein the computer infrastructure is further configured to store the load balancing performance metric on at least one site selector.

24. The system of claim 18, wherein the bias is based on at least one of networking speed, number of servers at each site, types of servers and their specific configurations.

25. The system of claim 18, wherein the load value is biased to:
   proactively identify those sites of the different sites that have a capacity to respond to the request; and
   automatically direct traffic away from sites which are running close to, at or over capacity.

26. The system of claim 18, wherein the load balancing performance metric is computed based on response times that are greater than the critical response time, which is a threshold used to determine whether the different sites or the one or more servers need to be marked down or not.

27. The system of claim 26, wherein the computer infrastructure is further configured to provide a limit on how many consecutive response times that are greater than the critical response time can be set, wherein:
   until the limit is exceeded, a last valid biased load value is used to route traffic;
   if a response time value cannot be obtained, a last biased load value cached from a previous cycle is used to route traffic; and
   a default biased load value is used to route traffic.

28. The system of claim 27, wherein the computer infrastructure is further configured to time stamp a last two response time values and make a comparison thereof, wherein if they are a same value, the last valid biased load value is used to route traffic.

29. A system for balancing workload, comprising:
   a computing device comprising a combination of hardware and software configured to:
      collect performance measurements for different sites in a network;
      generate at least one biased server load balancing performance metric based on a response time of servers located at the different sites; and
      route a request to a server at one of the different sites based on the at least one biased server load balancing performance metric,
   wherein the at least one biased server load balancing performance metric comprises a respective response time of the servers located at the different sites changed by a bias factor, and
   wherein the bias factor is a multiplier that accentuates a load issue by proactively taking into consideration overall architecture of the network in order to adjust workload among the one or more servers prior to any capacity problems;
   the load balancing performance metric is a load value; and the load value is calculated by:
      the bias factor=(upperbound−lowerbound)/critical response time; and
      load=round((the bias factor*the response time)+lowerbound).

30. A method to provide a service for establishing a computing infrastructure, comprising:
   collecting performance measurements for different sites in a network;
   generating at least one biased server load balancing performance metric based on the performance measurements of servers located at the different sites; and
   routing a request to a server at one of the different sites based on the biased server load balancing performance metric,
   wherein the at least one biased server load balancing performance metric comprises a respective performance measurement of the servers located at the different sites changed by a bias factor, and
   wherein the bias factor is a multiplier that accentuates a load issue by proactively taking into consideration overall architecture of the network in order to adjust workload among the one or more servers prior to any capacity problems;
   the load balancing performance metric is a load value; and the load value is calculated by:
      the bias factor=(upperbound−lowerbound)/critical response time; and
      load=round((the bias factor*response time)+lowerbound).

31. The method of claim 30, wherein the performance measurements are load balancing measurements of the different sites using at least response times.

32. The method of claim 30, further comprising determining a proximity between a requestor and the different sites, and using the proximity with the biased server performance metric to route the request.

33. The method of claim 32, wherein the proximity and the server load balancing performance metric are weighted.

34. A method of processing queries in a network, comprising the steps of:
   measuring performance of one or more servers at different locations;
   routing a request to the one of the one or more servers based on a computed load balancing performance metric including proximity to the requestor and a biased allocation of workload amongst the one or more servers,
   wherein the biased allocation of workload comprises a computed allocation of workload changed by a bias factor, and
   wherein the bias is a multiplier that accentuates a load issue by proactively taking into consideration overall architecture of the network in order to adjust the workload among the one or more servers prior to any capacity problems;
   the load balancing performance metric is a load value; and the load value is calculated by:
      factor=(upperbound−lowerbound)/critical response time; and
      load=round((factor*response time)+lowerbound).

35. A computer program product comprising a computer usable device having readable program code embodied in the device, the computer program product includes at least one processor to:
   collect performance measurements for different sites in a network;
   generate at least one biased server load balancing performance metric based on the performance measurements of servers located at the different sites; and
   route a request to a server at one of the different sites based on the biased server load balancing performance metric,
   wherein the at least one biased server load balancing performance metric comprises a respective performance measurement of the servers located at the different sites changed by a bias factor, and
   wherein the bias factor is a multiplier that accentuates a load issue by proactively taking into consideration overall architecture of the network in order to adjust workload among the one or more servers prior to any capacity problems;

the load balancing performance metric is a load value; and the load value is calculated by:

the bias factor=(upperbound−lowerbound)/critical response time; and load=round((the bias factor*response time)+lowerbound).

36. The method of claim 1, wherein providing a bias to the load balancing performance metric comprises adjusting the load balancing performance metric by the bias multiplier to determine the biased load balancing performance metric.

37. The method of claim 36, wherein the bias multiplier is user-supplied.

38. The method of claim 37, wherein the bias multiplier accounts for networking speed, an amount of servers at a respective site, types of servers at the respective site and overall configuration of servers at the respective site.

* * * * *